(12) United States Patent
Shigenaga

(10) Patent No.: US 12,479,454 B2
(45) Date of Patent: Nov. 25, 2025

(54) WIRELESS COMMUNICATION ABNORMALITY DETERMINATION DEVICE AND RECORDING MEDIUM

(71) Applicant: TOYOTA JIDOSHA KABUSHIKI KAISHA, Toyota (JP)

(72) Inventor: Masato Shigenaga, Utsunomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 18/377,578

(22) Filed: Oct. 6, 2023

(65) Prior Publication Data

US 2024/0182056 A1    Jun. 6, 2024

(30) Foreign Application Priority Data

Dec. 6, 2022   (JP) .................................. 2022-195040

(51) Int. Cl.
  *B60Q 1/00*      (2006.01)
  *B60L 53/12*     (2019.01)
  *B60W 50/14*     (2020.01)

(52) U.S. Cl.
  CPC ............. *B60W 50/14* (2013.01); *B60L 53/12* (2019.02); *B60W 2050/143* (2013.01)

(58) Field of Classification Search
  CPC . B60W 50/14; B60W 2050/143; B60L 53/12; B60L 53/62; B60L 3/0023; B60L 2210/30; B60L 53/38; H04W 24/04; H02J 50/12; H02J 50/90; H02J 2310/48; Y02T 10/72; Y02T 10/70; Y02T 10/7072; Y02T 90/12; Y02T 90/14

USPC ................ 340/438, 425.5, 439, 636.1, 636.2
See application file for complete search history.

(56) References Cited

U.S. PATENT DOCUMENTS

| | | | |
|---|---|---|---|
| 2016/0119098 A1* | 4/2016 | Oishi | ................ H04W 74/0816 370/329 |
| 2018/0241301 A1* | 8/2018 | Nagaoka | ................ B60L 53/122 |
| 2019/0305613 A1* | 10/2019 | Oshima | .................... H02J 50/12 |
| 2020/0101849 A1* | 4/2020 | Ghabra | ............. G06K 19/0723 |
| 2020/0156488 A1* | 5/2020 | Tsukamoto | ............. H02J 50/10 |
| 2021/0284186 A1* | 9/2021 | Sakakibara | ............. B60L 53/36 |

FOREIGN PATENT DOCUMENTS

| | | |
|---|---|---|
| JP | 5170214 B2 | 3/2013 |
| JP | 2016-141161 A | 8/2016 |
| JP | 2020-127312 A | 8/2020 |
| JP | 2021-189747 A | 12/2021 |
| JP | 2022-096935 A | 6/2022 |

* cited by examiner

*Primary Examiner* — Anh V La
(74) *Attorney, Agent, or Firm* — Oliff PLC

(57) ABSTRACT

A wireless communication abnormality determination device includes: a processor mounted on a vehicle which is non-contact chargeable. Further, the processor determines that there is an abnormality in a wireless communication device mounted on the vehicle and notify a user of the vehicle of the abnormality when determining that the vehicle is parked on a ground power supply device and the vehicle cannot perform wireless communications with the ground power supply device.

2 Claims, 3 Drawing Sheets

WIRELESS COMMUNICATION ABNORMALITY DETERMINATION DEVICE AND RECORDING MEDIUM

CROSS-REFERENCE TO RELATED APPLICATION(S)

The present application claims priority to and incorporates by reference the entire contents of Japanese Patent Application No. 2022-195040 filed in Japan on Dec. 6, 2022.

BACKGROUND

The present disclosure relates to a wireless communication abnormality determination device and a recording medium.

Japanese Laid-open Patent Publication No. 2022-096935 discloses a technique for setting a traveling locus for moving to the position of the ground power supply device when a vehicle for performing non-contact charging can acquire the position of the ground power supply device, and for setting a traveling locus for moving to the parking area when the position of the ground power supply device cannot be acquired.

SUMMARY

There is a need for providing a wireless communication abnormality determination device and a wireless communication abnormality determination program capable of determining whether there is an abnormality in wireless communication when a vehicle performs non-contact charging.

According to an embodiment, a wireless communication abnormality determination device includes: a processor mounted on a vehicle which is non-contact chargeable. Further, the processor determines that there is an abnormality in a wireless communication device mounted on the vehicle and notify a user of the vehicle of the abnormality when determining that the vehicle is parked on a ground power supply device and the vehicle cannot perform wireless communications with the ground power supply device.

According to an embodiment, a non-transitory computer-readable recording medium stores a wireless communication abnormality determination program which causes a processor mounted on a vehicle which is non-contact chargeable to determine that there is an abnormality in a wireless communication device mounted on the vehicle and notify a user of the vehicle of the abnormality when determining that the vehicle is parked on a ground power supply device and the vehicle cannot perform wireless communications with the ground power supply device.

DETAILED DESCRIPTION

In the prior art, the vehicle performs wireless communication with the ground power supply device when performing non-contact charging, but may not be able to wireless communication depending on the situation. In such a case, whether the abnormality of the wireless communication device of the vehicle side (failure), it is difficult to determine whether a transient communication failure, there is a possibility that not prompt the user of the vehicle to repair and inspect.

A wireless communication abnormality determination device and a wireless communication abnormality determination program according to an embodiment of the present disclosure will be described with reference to the drawings. In addition, components in the following embodiments include those which can be substituted and easily by those skilled in the art, or those which are substantially the same.

Non-Contact Power Supply System

Figure 1:
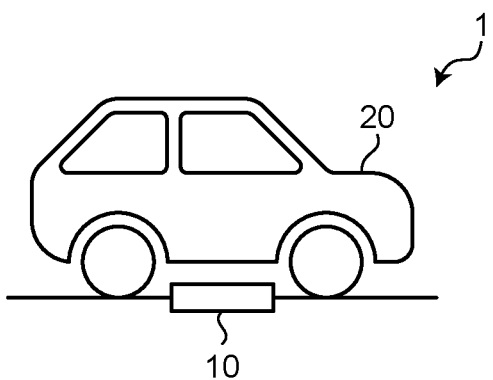
FIG. 1 is a diagram illustrating a schematic configuration of a non-contact power supply system to which a wireless communication abnormality determination device according to an embodiment is applied.

A non-contact power supply system for realizing a wireless communication abnormality determination device according to an embodiment will be described with reference to FIGS. 1 and 2. As illustrated in FIG. 1, the non-contact power supply system 1 includes a ground power supply device 10 and a vehicle 20. The ground power supply device 10 and the vehicle 20 are both provided with a communication function and are configured to communicate with each other through the network N.

Ground Power Supply Device

The ground power supply device 10 is, for example, as illustrated in FIG. 1, in a road (underground) on which the vehicle 20 travels, is buried in the center of the lane. As illustrated in FIG. 2, the ground power supply device 10 includes a power transmission unit 11 and a wireless communication unit (wireless communication device) 12.

The power transmission unit 11 sends the power supplied from the power supply (not illustrated) to the vehicle 20. The power transmission unit 11 includes, for example, a rectifier circuit for converting AC power supplied from a power source (not illustrated) into DC power, an inverter for converting the DC power into AC power, a power transmission coil or the like for transmitting AC power after conversion.

The wireless communication unit 12 communicates with the wireless communication unit 22 of the vehicle 20 when performing the non-contact power transmission to the vehicle 20. The wireless communication unit 12 acquires vehicle information of the vehicle 20 by communicating with the vehicle 20 during the non-contact power transmission. The vehicle information, for example, the required power supply power of the vehicle 20, the vehicle identification information (vehicle ID), the state of the battery 24 (SOC, thermal, etc.), the present position information of the vehicle 20, the state and various parameters of the power receiving unit 21 (outer diameter of the coil, inner diameter, number of turns, height from the ground, etc.) and the like.

The wireless communication unit 12 communicates with the vehicle 20 by narrow-area wireless communication or wide-area wireless communication. Narrow-area wireless communication, for example, it is assumed that the communication distance is less than 10 meters. The narrow area wireless communication, for example, any communication standards established by IEEE, ISO, IEC or the like (e.g., Bluetooth (registered trademark), ZigBee (registered trademark)) compliant communication and the like. Further, as a technique for performing narrow area wireless communication, for example, Radio Frequency Identification (RFID), dedicated Short Range Communication (DSRC), etc. are used.

Wide-area wireless communications envisage, for example, communications with a range of 10 meters to 10 kilometers. As the wide-area wireless communication, for example, there are communication conforming to any communication standard such as 3GPP (registered trademark), a 4G, LTE, 5G, WiMAX established by IEEE, and the like.

Vehicle

The vehicle 20 is a mobile body capable of non-contact charging. The vehicle 20 includes, for example, a hybrid vehicle (Hybrid Electric Vehicle: HEV), a plug-in hybrid vehicle (Plug-in Hybrid Electric Vehicle: PHEV), an electric vehicle (Battery Electric Vehicle: BEV), and the like. The vehicle 20 may also be a manually operated vehicle or an automatically operated vehicle.

Figure 2:
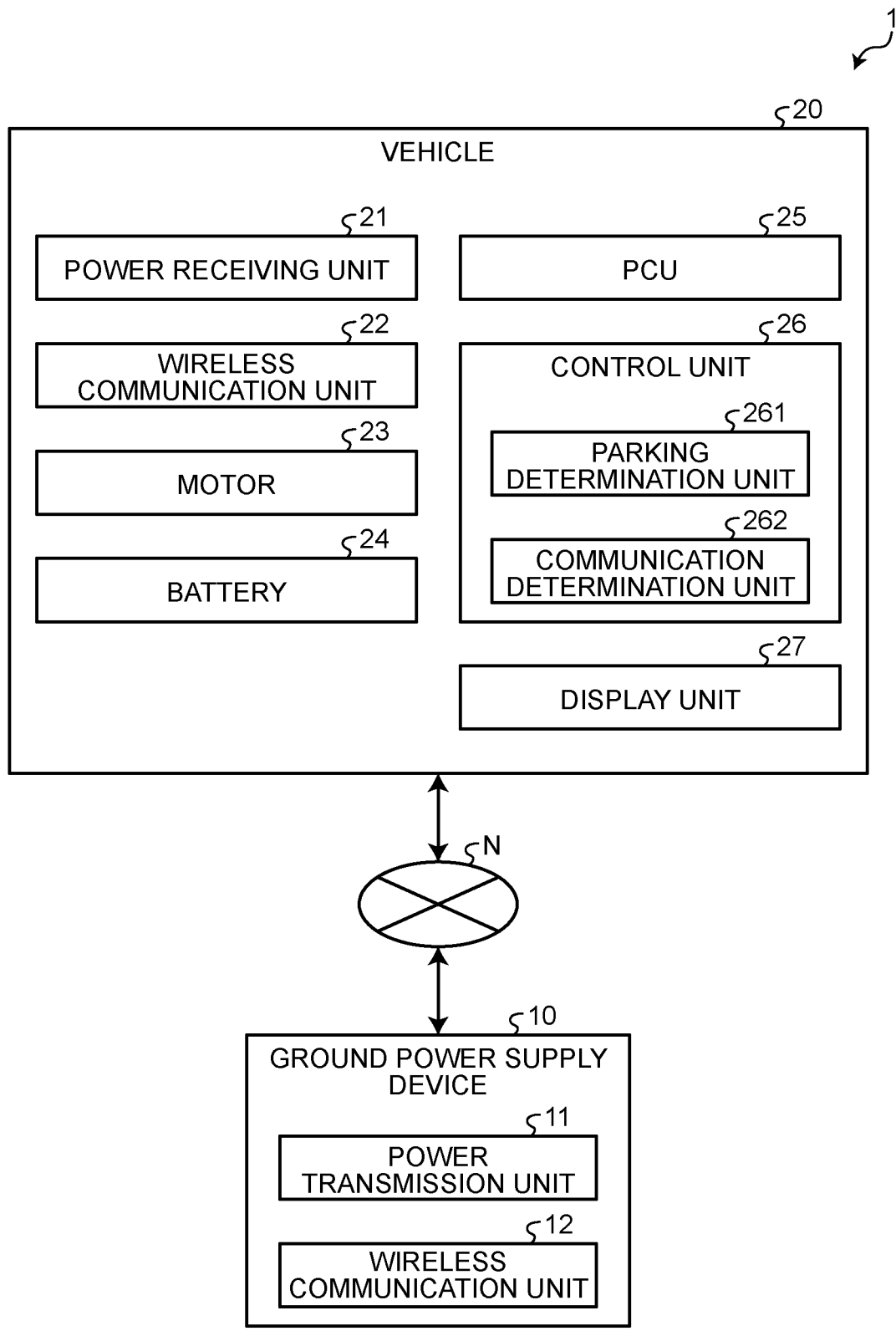
FIG. 2 is a block diagram illustrating a specific configuration of a non-contact power supply system to which a wireless communication abnormality determination device according to an embodiment is applied.

As illustrated in FIG. 2, the vehicle 20 includes a power receiving unit 21, a wireless communication unit (wireless communication device) 22, a motor 23, a battery 24, a Power Control Unit (PCU) 25, a control unit 26, and a display unit (display) 27.

The power receiving unit 21 supplies the power received from the power transmission unit 11 of the ground power supply device 10 to the battery 24. The power receiving unit 21 includes, for example, a power receiving coil for receiving power, a rectifier circuit for converting AC power supplied from the power receiving coil into DC power, a charging circuit or the like for supplying DC power after conversion to the battery 24.

When receiving power from the ground power supply device 10, the wireless communication unit 22 communicates with the wireless communication unit 12 of the ground power supply device 10. The wireless communication unit 22 transmits the vehicle information of the vehicle 20 by communicating with the ground power supply device 10 during the non-contact power transmission. The wireless communication unit 22 communicates with the ground power supply device 10 by narrow area wireless communication or wide area wireless communication as described above.

The motor 23 is, for example, an AC synchronous motor, and functions as an electric motor and generator. The motor 23, when functioning as an electric motor, is driven by the electric power stored in the battery 24 as a power source. On the other hand, when decelerating the vehicle 20, the motor 23 is driven by the rotation of the wheels. Thus, the motor 23 functions as a generator to generate regenerative electric power.

The battery 24 is a rechargeable secondary battery and is composed of, for example, a lithium ion battery, a nickel metal hydride battery, or the like. The battery 24 stores the power required for traveling of the vehicle 20 (e.g., driving power of the motor 23). When power from the power transmission unit 11 to the power receiving unit 21 is supplied, the battery 24 is charged.

Further, when the regenerative power generated by the motor 23 is supplied to the battery 24, the battery 24 is charged.

The PCU 25 is electrically connected to the battery 24 and the motor 23. The PCU 25 includes, for example, inverters, boost converters and DC/DC converters. The inverter converts the DC power supplied from the battery 24 into AC power, and supplies the AC power to the motor 23. On the other hand, the inverter converts the AC power generated by the motor 23 (regenerative power) into DC power, and supplies the DC power to the battery 24. The boost converter boosts the voltage of the battery 24 as necessary when the power stored in the battery 24 is supplied to the motor 23. DC/DC converters step down the voltage of the battery 24 when the power stored in the battery 24 is supplied to various electronic devices such as headlights.

The control unit 26 is an electronic control unit (Electronic Control Unit: ECU) having a microcomputer composed of a Central Processing Unit (CPU), a Read Only Memory (ROM), a Random Access Memory (RAM), and the like as main components, and executes various programs.

The control unit 26, by controlling the components and the like through the execution of the program, to realize a function that matches the predetermined purpose. The control unit 26, through the execution of the program functions as a parking determination unit 261 and the communication determination unit 262.

The parking determination unit 261 determines whether the vehicle 20 is parked on the ground power supply device 10. The method of parking determination unit 261 performs parking determination of the vehicle 20 is not particularly limited. The parking determination unit 261 can perform parking determination by, for example, a method using a passive beacon, a method using a position positioning device such as a Global Positioning System (GPS), a method of determining the approach of the vehicle 20 to the ground power supply device 10 using an image-recognition such as a camera, or the like.

The communication determination unit 262 determines whether there is an abnormality in the wireless communication unit 22 of the vehicle 20. The communication determination unit 262, for example, by the parking determination unit 261, when the vehicle 20 is determined to have parked on the ground power supply device 10, determines whether the vehicle 20 can wirelessly communicate with the ground power supply device 10. When it is determined that the vehicle 20 cannot wirelessly communicate with the ground power supply device 10, the communication determination unit 262 determines that an abnormality is in the wireless communication unit 22 mounted on the vehicle 20 and notifies a user (for example, a driver or the like) of the vehicle 20 through the display unit 27.

As described above, the communication determination unit 262 determines that there is a high possibility that the abnormality of the wireless communication unit 22 is caused when the wireless communication cannot be performed in the situation where the wireless communication is established if the environment of the wireless communication is in a normal state.

The display unit 27 outputs predetermined information to the user of the vehicle 20. The display unit 27 is provided in the vehicle interior at a position visible to the user. The display unit 27 can be realized by, for example, a car navigation device, a multi-information display, a head-up display, or the like.

The display unit 27 may be implemented by, for example, a portable information terminal (for example, a smartphone, a tablet terminal, or the like) carried by a user. In addition to the output function of information, the display unit 27 may include an input function such as a microphone, a touch panel, or the like that can input an instruction from a user.

The display unit 27, for example, by the communication determination unit 262, when the vehicle 20 is determined not to be able to wirelessly communicate with the ground power supply device 10, displays information prompting repair inspection of the wireless communication unit 22 (e.g., a message, etc.).

Wireless Communication Abnormality Determination Method

Figure 3:
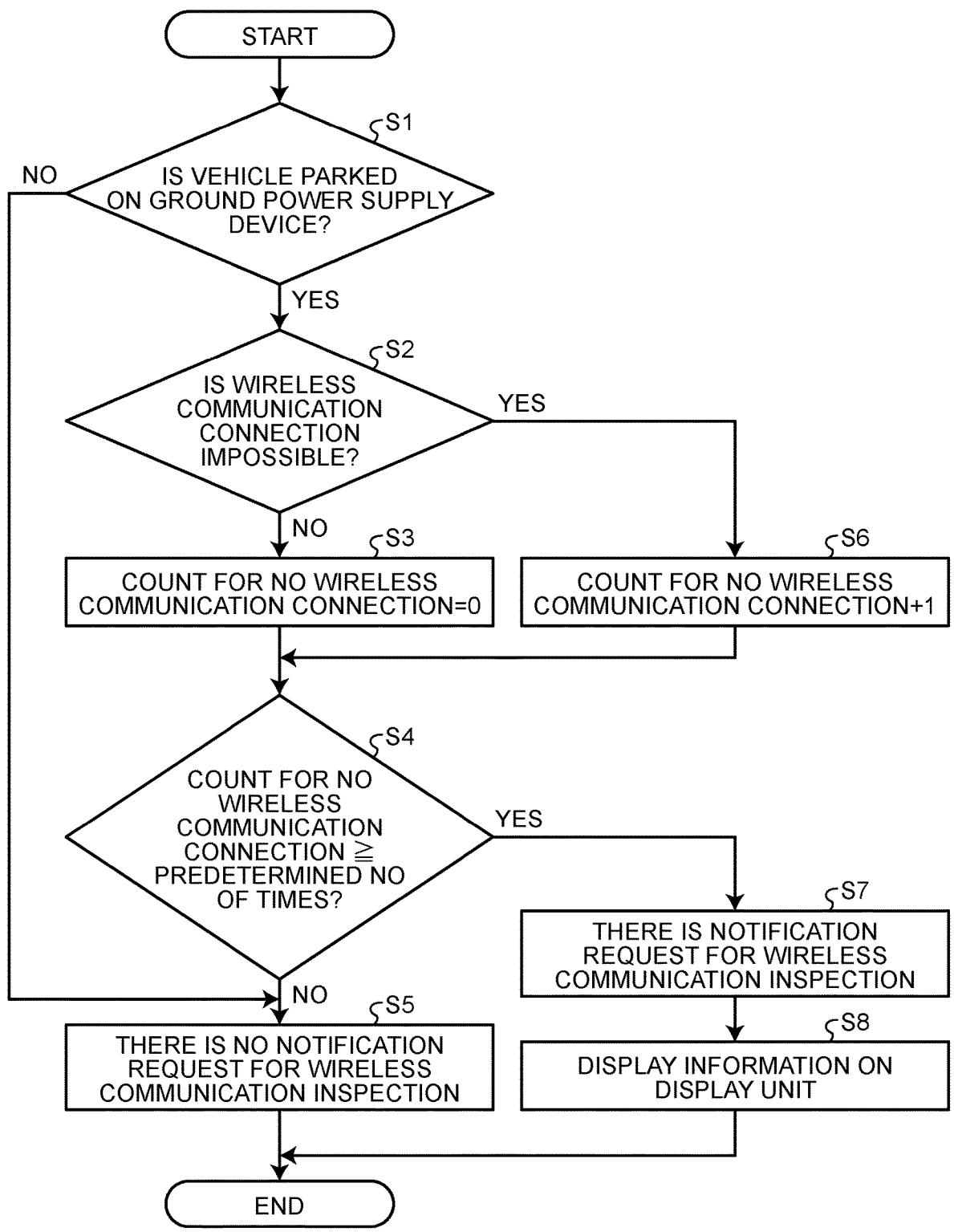
FIG. 3 is a flowchart illustrating a flow of a wireless communication abnormality determination method that is executed by the wireless communication abnormality determination device according to an embodiment.

An example of a processing procedure of the wireless communication abnormality determination method executed by the wireless communication abnormality determination device according to the embodiment will be described with reference to FIG. 3.

First parking determination unit 261 determines whether the vehicle 20 is parked on the ground power supply device 10 (step S1). In Step S1, when it is determined that the vehicle 20 is parked on the ground power supply device 10 (Yes in Step S1), the communication determination unit 262 determines whether the vehicle 20 and the ground power supply device 10 cannot perform wireless communication (Step S2).

When it is determined in the step S2 that it is not impossible to perform wireless communication (i.e., it is possible to perform wireless communication) between the vehicle 20 and the ground power supply device 10 (No in step S2), the communication determination unit 262 determines that "count for no wireless communication connection=0" (Step S3).

Subsequently, the communication determination unit 262 determines whether the count for no wireless communication connection is equal to or more than a predetermined number of times determined in advance (Step S4). In Step S4, when it is determined that the count for no wireless communication connection is not the predetermined number of times or more (No in Step S4), the communication determination unit 262 determines that there is no notification request for inspection of the wireless communication unit 22 (hereinafter, referred to as "wireless communication inspection") (Step S5), and completes the present process.

In Step S1, when it is determined that the vehicle 20 is not parked on the ground power supply device 10 (No in Step S1), the communication determination unit 262 advances to Step S5. Further, in the step S2, when it is determined that the vehicle 20 and the ground power supply device 10 are not capable of wireless communication (Yes in step S2), the communication determination unit 262 is set to "count for no wireless communication connection +1" (Step S6), and proceeds to the step S4.

In Step S4, when the count for no wireless communication connection is determined to be equal to or more than the predetermined number of times (Yes in Step S4), the communication determination unit 262 determines that there is a notification request of the wireless communication inspection (Step S7), and displays the information indicating that effect on the display unit 27 (Step S8), thereby completing the present process.

In the wireless communication abnormality determination device and the wireless communication abnormality determination program according to the embodiment described above, when the vehicle 20 cannot wirelessly communicate with the ground power supply device 10, it is determined that an abnormality is in the wireless communication unit 22 and notifies the user of the vehicle 20 through the display unit 27. Therefore, according to the wireless communication abnormality determination device and the wireless communication abnormality determination program according to the embodiment, it is possible to determine whether there is an abnormality in the wireless communication when the vehicle 20 performs the non-contact charging and urge the user of the vehicle 20 to perform the repair inspection.

Here, in the abnormality detection of the conventional wireless communication, since the communication may not be possible even if the hardware (wireless communication unit) is not broken, even if detecting the wireless communication abnormality, it is impossible to determine whether the failure, it is impossible to prompt the user to repair and inspect. On the other hand, in the wireless communication abnormality determination device and the wireless communication abnormality determination program according to the embodiment, the state in which the ground power supply device 10 and the vehicle 20 are close to each other is checked to monitor the state in which the wireless communication is not performed by a predetermined number of times in spite of the intention of charging. Thus, it becomes possible to determine whether there is an abnormality in the wireless communication unit 22, it is possible to notify the user that the repair inspection is required state.

Further effects and variations can be readily derived by one skilled in the art. Thus, the broader aspects of the invention are not limited to the specific details and representative embodiments represented and described above. Accordingly, various changes may be made without departing from the spirit or scope of the overall inventive concept defined by the appended claims and their equivalents.

For example, instead of the parking determination unit 261 of the vehicle 20, the ground power supply device 10 side may have the function of parking determination of the same vehicle 20 as the parking determination unit 261.

Further, the communication determination unit 262 has determined whether there is an abnormality in the wireless communication unit 22 of the vehicle 20 side, but may determine whether there is an abnormality in the wireless communication unit 12 of the ground power supply device 10 side, instead of whether there is an abnormality in the wireless communication unit 22, or in addition to whether there is an abnormality in the wireless communication unit 22. In this case, when it is determined that there is an abnormality in the wireless communication unit 12, through a display unit provided in the control facility or the like of the ground power supply device 10, it prompts the user (e.g. staff of the control facility) repair inspection of the wireless communication unit 12.

According to the present disclosure, it is possible to determine whether there is an abnormality in the wireless communication when the vehicle performs the non-contact charging, and to urge the user of the vehicle to perform the repair inspection.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless communication abnormality determination device comprising:
   a processor mounted on a vehicle, the vehicle including a wireless communication device for performing wireless-communications with a ground power supply device and is non-contact chargeable from the ground power supply device using the wireless communications via the wireless communication device, wherein the processor is configured to determine that there is an abnormality in the wireless communication device of the vehicle and notify a user of the vehicle of the abnormality when determining that the vehicle is parked on a ground power supply device and the vehicle cannot perform wireless communications with the ground power supply device via the wireless communication device.

2. A non-transitory computer-readable recording medium storing a wireless communication abnormality determination program causing a processor mounted on a vehicle, the vehicle including a wireless communication device for performing wireless-communications with a ground power supply device and is non-contact chargeable from the ground power supply device using the wireless communications via the wireless communication device, the program causing the processor to perform the following:

determine that there is an abnormality in the wireless communication device of the vehicle and notify a user of the vehicle of the abnormality when determining that the vehicle is parked on a ground power supply device and the vehicle cannot perform wireless communications with the ground power supply device via the wireless communication device.

\* \* \* \* \*